US008676962B2

(12) United States Patent
Yarter

(10) Patent No.: US 8,676,962 B2
(45) Date of Patent: Mar. 18, 2014

(54) METHODS, SYSTEMS, AND COMPUTER PROGRAM PRODUCTS FOR IMPLEMENTING DATA ASSET MANAGEMENT ACTIVITIES

(75) Inventor: Lawrence C. Yarter, Clinton Corners, NY (US)

(73) Assignee: International Business Machines Corporation, Armonk, NY (US)

( * ) Notice: Subject to any disclaimer, the term of this patent is extended or adjusted under 35 U.S.C. 154(b) by 1691 days.

(21) Appl. No.: 11/771,448

(22) Filed: Jun. 29, 2007

(65) Prior Publication Data

US 2009/0006149 A1    Jan. 1, 2009

(51) Int. Cl.
*G06F 15/173* (2006.01)
*G06F 7/00* (2006.01)

(52) U.S. Cl.
USPC .......................................... 709/224; 707/609

(58) Field of Classification Search
USPC ................................ 709/223–226; 707/1–10
See application file for complete search history.

(56) References Cited

U.S. PATENT DOCUMENTS

| 5,721,825 | A * | 2/1998 | Lawson et al. ................. 709/203 |
| 6,768,994 | B1 * | 7/2004 | Howard et al. .................. 707/10 |
| 2003/0074215 | A1 | 4/2003 | Morciniec et al. |
| 2003/0217036 | A1 | 11/2003 | Haunschild et al. |
| 2004/0019500 | A1 | 1/2004 | Ruth |
| 2004/0098358 | A1 | 5/2004 | Roediger |
| 2005/0075916 | A1 | 4/2005 | Lathram |
| 2005/0228688 | A1 * | 10/2005 | Visser et al. ........................ 705/1 |
| 2006/0100897 | A1 | 5/2006 | Halloran, Jr. et al. |
| 2006/0106626 | A1 | 5/2006 | Jeng et al. |
| 2006/0155578 | A1 | 7/2006 | Eisenberger |
| 2006/0195476 | A1 | 8/2006 | Nori |
| 2007/0136570 | A1 * | 6/2007 | Frank et al. ........................ 713/2 |

* cited by examiner

*Primary Examiner* — Afshawn Towfighi
(74) *Attorney, Agent, or Firm* — Cantor Colburn LLP

(57) ABSTRACT

Methods, systems, and computer program products for implementing data asset management activities are provided. A method includes defining authorization and authentication permissions for accessing network entities of an organization, defining rules for conducting audits and audit response activities with respect to the network entities, and executing an audit of the network entities by applying the rules to events occurring at the network entities during the audit. The method also includes generating a summary of results of the audit.

17 Claims, 4 Drawing Sheets

METHODS, SYSTEMS, AND COMPUTER PROGRAM PRODUCTS FOR IMPLEMENTING DATA ASSET MANAGEMENT ACTIVITIES

BACKGROUND OF THE INVENTION

The present disclosure relates generally to information management and, in particular, to methods, systems, and computer program products for implementing data asset management activities for an enterprise.

Small and medium businesses are now facing the same challenges of large enterprises with the explosion of data (structured, partially structured, and unstructured), globalization, outsourcing and rapid resource turnover rates, managing data access in an ever changing environment of legal and corporate compliance issues, combined with the ongoing struggle to make operations more efficient through consolidation.

Few businesses have a full accounting of the information technology (IT) assets that support their processes. This may inhibit their ability to develop a roadmap for infrastructure and process simplification. In an environment where acquisitions are commonplace and corporations are routinely moving to outsourcing models for IT infrastructure and manufacturing, the problem of data movement and persistence of duplicate data within the enterprise is a growing challenge which, if unchecked, may have an immediate cost to their IT budgets and erode their ability to be agile in changing their processes to meet business needs.

Corporations also have long promoted the notion of division, brand, geography, etc., competition within medium to large enterprises which has bred a culture of allowing ad hoc access to information where the data would be captured from the corporate sources and re-purposed for establishing metrics for performance analysis, forecasting, etc. This ad hoc pattern and the resulting data proliferation may diminish an enterprise's ability to be agile when changes are needed. As a result, the enterprise may not know what effect the retirement of an asset or the centralization of an IT asset will have on the overall business. Though ad hoc users are generally given an approved authority for their usage of an information domain, the extraction of information from enterprise sources and the persisting and re-purposing of the information domains, combined with the addition of other information domains, may have a negative impact to the business, particularly from a compliance perspective and may further distract businesses with multiple reporting and measurement processes and multiple versions of the "truth" for metrics.

What is needed, therefore, is a way to deliver proactive discovery of data proliferation and a system for managing this information.

BRIEF SUMMARY OF THE INVENTION

Embodiments of the invention include methods for implementing data asset management activities. A method includes defining authorization and authentication permissions for accessing network entities of an organization, defining rules for conducting audits and audit response activities with respect to the network entities, and executing an audit of the network entities by applying the rules to events occurring at the network entities during the audit. The method also includes generating a summary of results of the audit.

Additional embodiments include systems for implementing data asset management activities. A system includes a host system executing a data steward rules engine. The data steward rules engine implements a method. The method includes defining authorization and authentication permissions for accessing network entities of an organization, defining rules for conducting audits and audit response activities with respect to the network entities, and executing an audit of the network entities by applying the rules to events occurring at the network entities during the audit. The method also includes generating a summary of results of the audit.

Further embodiments include a computer program product for implementing data asset management activities. A computer program product includes instructions for causing a computer to implement a method. The method includes defining authorization and authentication permissions for accessing network entities of an organization, defining rules for conducting audits and audit response activities with respect to the network entities, and executing an audit of the network entities by applying the rules to events occurring at the network entities during the audit. The method also includes generating a summary of results of the audit.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Methods, systems, and computer program products for implementing data asset management activities are provided in accordance with exemplary embodiments. The data asset management activities utilize a number of standard information technology (IT) patterns and provide an infrastructure for compliance measurement with a focus on the unknown proliferation of data within the enterprise supporting anonymous processes that are known to destabilize large enterprises, add ongoing support costs, and add to the complexity of the IT infrastructure, thereby reducing its agility to change.

The data asset management activities are designed to give objective information to designated individuals (e.g., data stewards) of the enterprise or organization to allow effective end-to-end management of the data assets (e.g., databases, system resources, applications, etc.) for the enterprise. This may be accomplished, in part, using probe technology to discover deposits of data (e.g., structured, partially structured, and unstructured content) that can then be assessed against business and regulatory controls, which are defined as rules. The results of the probes and key performance indicators (KPIs) achieved per the defined rules are then deposited into a data warehouse for mining and reporting on opportunities for simplifying the information delivery infrastructure, reducing the number of actors accessing information, and gaining positive control and knowledge of the processes requiring the information.

Figure 1:
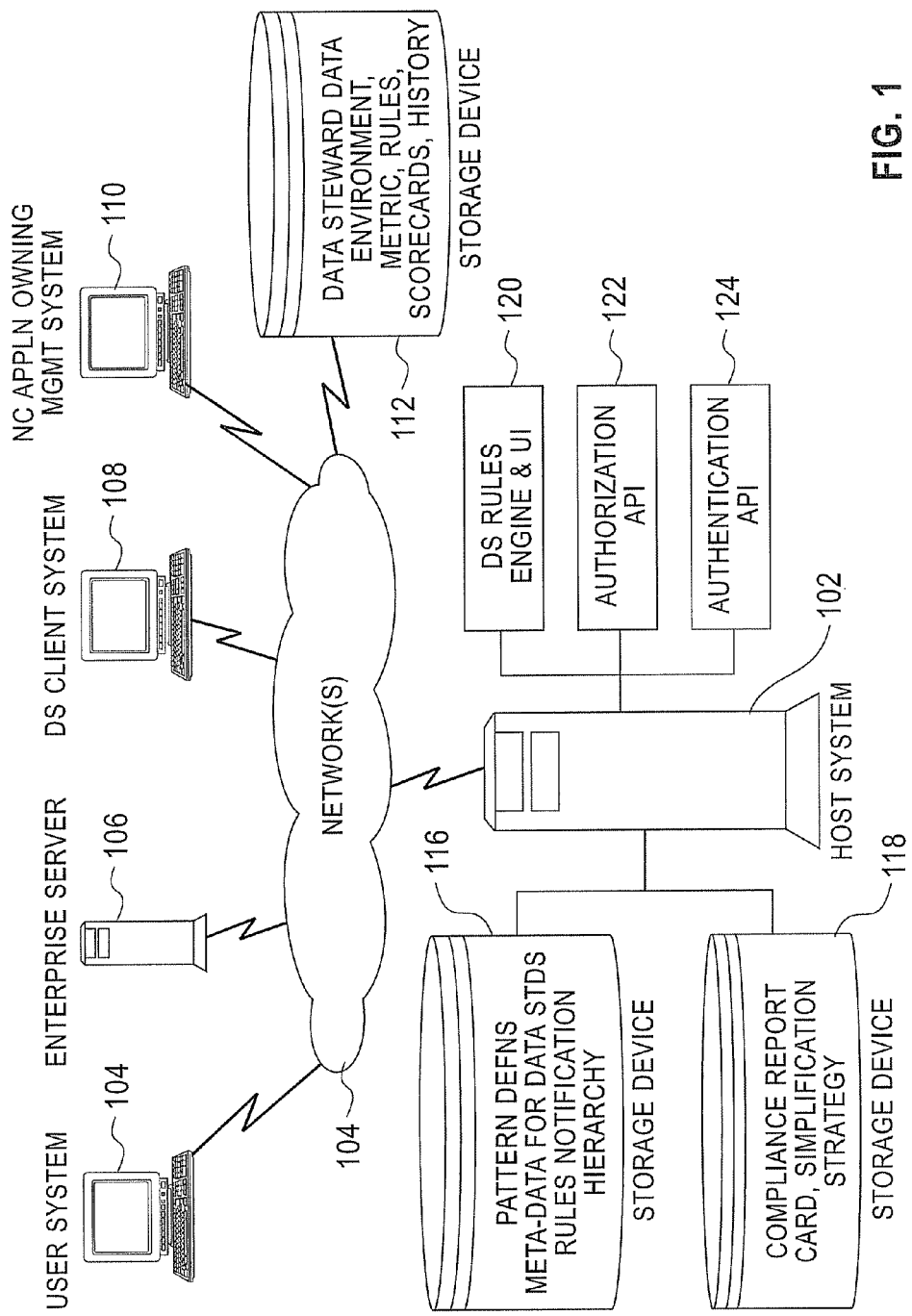
FIG. 1 is a block diagram of a system upon which data asset management activities may be implemented in exemplary embodiments.

Turning now to FIG. 1, a system upon which the data asset management activities may be implemented in accordance with exemplary embodiments will now be described. The system of FIG. 1 includes network entities 102-112 in communication with one another via one or more networks 114. For purposes of illustration, the system of FIG. 1 includes a business enterprise. It will be understood that the system of FIG. 1 may also include trading partners of the business enterprise that share information over a secure network.

Each of network entities 104, 108, and 110 may be implemented using a general-purpose computer executing a computer program for carrying out the processes described herein. The network entities 104, 108, and 110 may be personal computers (e.g., a lap top, a personal digital assistant) or host attached terminals. In exemplary embodiments, network entity 104 refers to a user system operated by a member of the enterprise, network entity 108 refers to a data steward client system, and network entity 110 refers to a non-compliant application owning management ("AOM") system.

In exemplary embodiments, user system 104 is operated by an ad hoc user. An ad hoc user may be defined as an authorized user of any trusted data warehouse or operational system within the enterprise system of FIG. 1. An ad hoc user may utilize business intelligence or database tools to extract information from those trusted warehouses where the content of the extract and the volume of the extracts are unknown. Data steward client system 108 is operated by a data steward within the enterprise. The data steward is tasked with the responsibility of creating the technical definitions of the data within the scope of their particular domain. Data domains refer to organized groups of data, e.g., customer information, product information, fulfillment information, contract information, customer service management information, etc. The data steward may also be responsible for the end-to-end use, distribution, and validity of the data within their domain. The AOM system 110 may be operated by a management individual who is responsible for either of the ad hoc user or enterprise server, as well as the remediation of any non-compliances associated therewith.

Each of network entities 102 and 106 may be implemented using one or more servers operating in response to a computer program stored in a storage medium accessible by the servers. The network entities 102 and 106 may operate as network servers (e.g., web servers) to communicate with other network entities (e.g., entities 104, 108, 110, 112, 116, and 118). The network entities 102 and 106 handle sending and receiving information to and from other network entities and can perform associated tasks. The network entities 102 and 106 may also include a firewall to prevent unauthorized access thereto and enforce any limitations on authorized access. For instance, an administrator may have access to the entire system and have authority to modify portions of the system. A firewall may be implemented using conventional hardware and/or software as is known in the art.

The network entities 102 and 106 may also operate as application servers. The network entity 102 refers to a host system that executes one or more computer programs to provide the data asset management functions. As previously described, it is understood that separate servers may be utilized to implement the network server functions and the application server functions. Alternatively, the network server, the firewall, and the application server may be implemented by a single server executing computer programs to perform the requisite functions.

Host system 102 may implement a variety of business applications typically used in a business environment. In addition, host system 102 executes a business intelligence and/or database management application, an authorization application programming interface (API) 122, an authentication API 124, and a data steward rules engine and user interface 120 for facilitating the data asset management activities.

Network entity 106 refers to an enterprise server of the organization. The enterprise server may be defined as any deployed server within the enterprise of the system of FIG. 1 that is used in the course of conducting business operations.

In exemplary embodiments, each of network entities 104-110 includes probe instrumentation. The probe instrumentation enables auditing of the network entities 104-110 as described herein.

While only one each of a user system 104, enterprise server 106, DS client system 108, and NC application owning management system 110 are shown, it will be understood that multiple user systems, enterprise servers, DS client systems, and NC AOM systems may be employed to realize the advantages of the exemplary embodiments.

Networks 114 may be any type of known networks including, but not limited to, a wide area network (WAN), a local area network (LAN), a global network (e.g. Internet), a virtual private network (VPN), and an intranet. The networks 114 may be implemented using a wireless network or any kind of physical network implementation known in the art. Network entities 102-112 may be in communication through multiple networks (e.g., intranet and Internet) so that not all network entities are coupled through the same network. In one embodiment, the network 114 is an intranet and one or more network entities execute a user interface application (e.g. a web browser) to contact the host system 102 through the network 114.

Host system 102 is in communication with storage devices 112, 116, and 118. The storage devices 112, 116, and 118 may be implemented as data repositories used in providing the data asset management functions. It is understood that the storage devices 112, 116, and 118 may be implemented using memory contained in the host system 102 or that they may be separate physical devices. The storage devices 112, 116, and 118 are logically addressable as consolidated data sources across a distributed environment that includes networks 114. Information stored in the storage devices 112, 116, and 118 may be retrieved and manipulated via the network entities 102, 104, 106, 108, and/or 110.

The data repositories include one or more databases containing information used in providing the data asset management functions. For example, storage device 112 refers to a data warehouse that stores data steward information including metrics, rules, scorecards, and history data. The history data includes results of the probes, results of applications of the rules to the probes, and related information that may be used in data mining activities as described further herein. Storage device 116 stores data pattern definitions, meta-data used for data standards, response measures, and notification hierarchies. A data pattern refers to multiple instances of similar or like data. For example, a data pattern relating to a customer information data domain may include a specified number of address data instances associated with a system or user. A data steward responsible for customer information may define a data pattern that includes address data (e.g., terms such as 'street', 'st', 'state', etc.) Response measures include actions defined for responding to non-compliances determined as a result of a probe. Notification rules may be established for identifying individuals to be notified upon the occurrence of an event (e.g., a particular non-compliance event).

Storage device 118 stores compliance report cards and simplification strategies. Compliance report cards and simplification strategies are described further herein.

The data asset management functions utilize numerous standard IT patterns to deliver information to a new process of proactively evaluating the placement of data assets, and a management system to discover and manage processes within the enterprise, thereby enabling process simplification.

Figure 2:
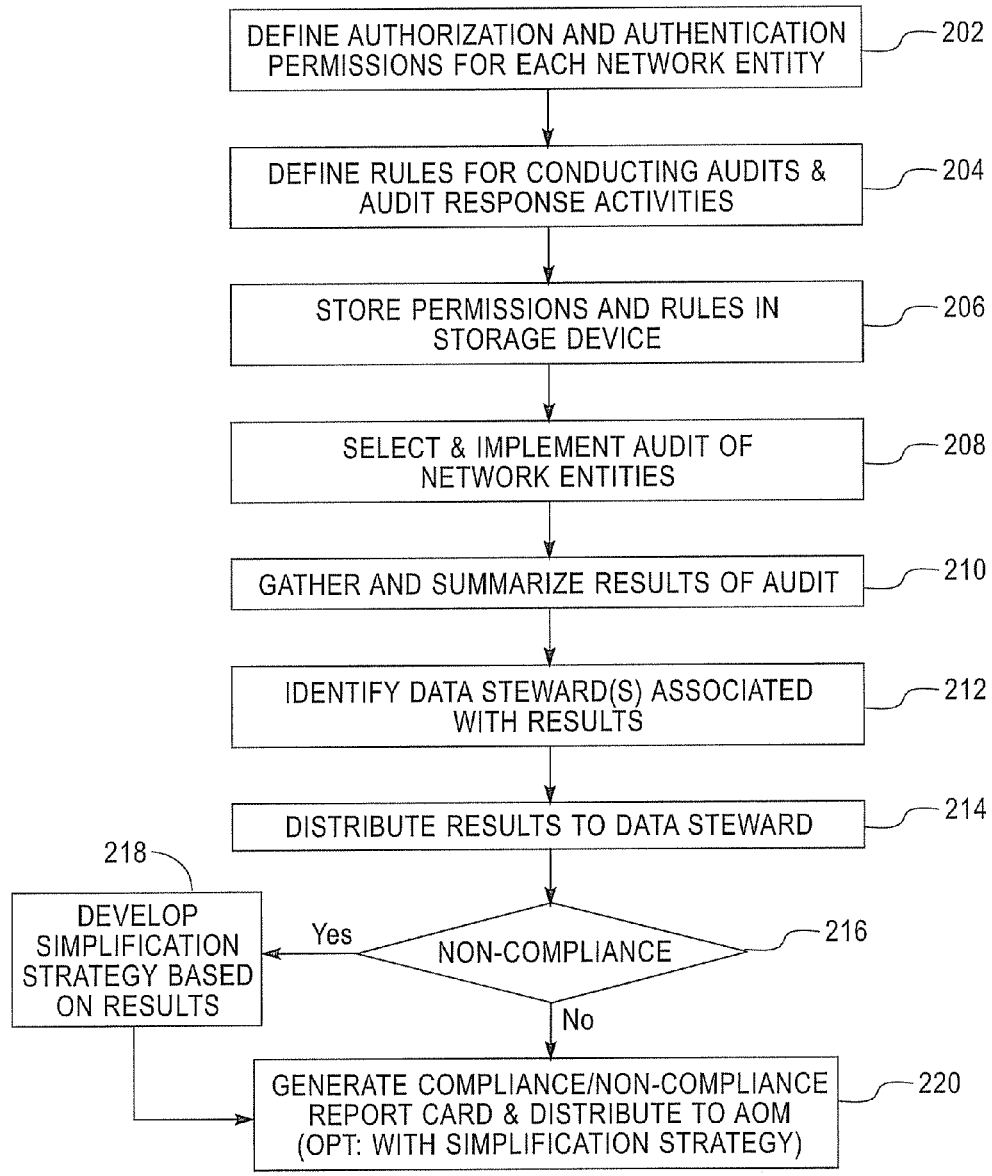
FIG. 2 is a flow diagram describing a process for implementing the data asset management activities in exemplary embodiments.

Turning now to FIG. 2, an exemplary process for implementing the data asset management activities will now be described.

At step 202, a data steward at DS client system 108 defines authorization and authentication requirements for users of data assets associated with his/her data domain.

Figure 3:
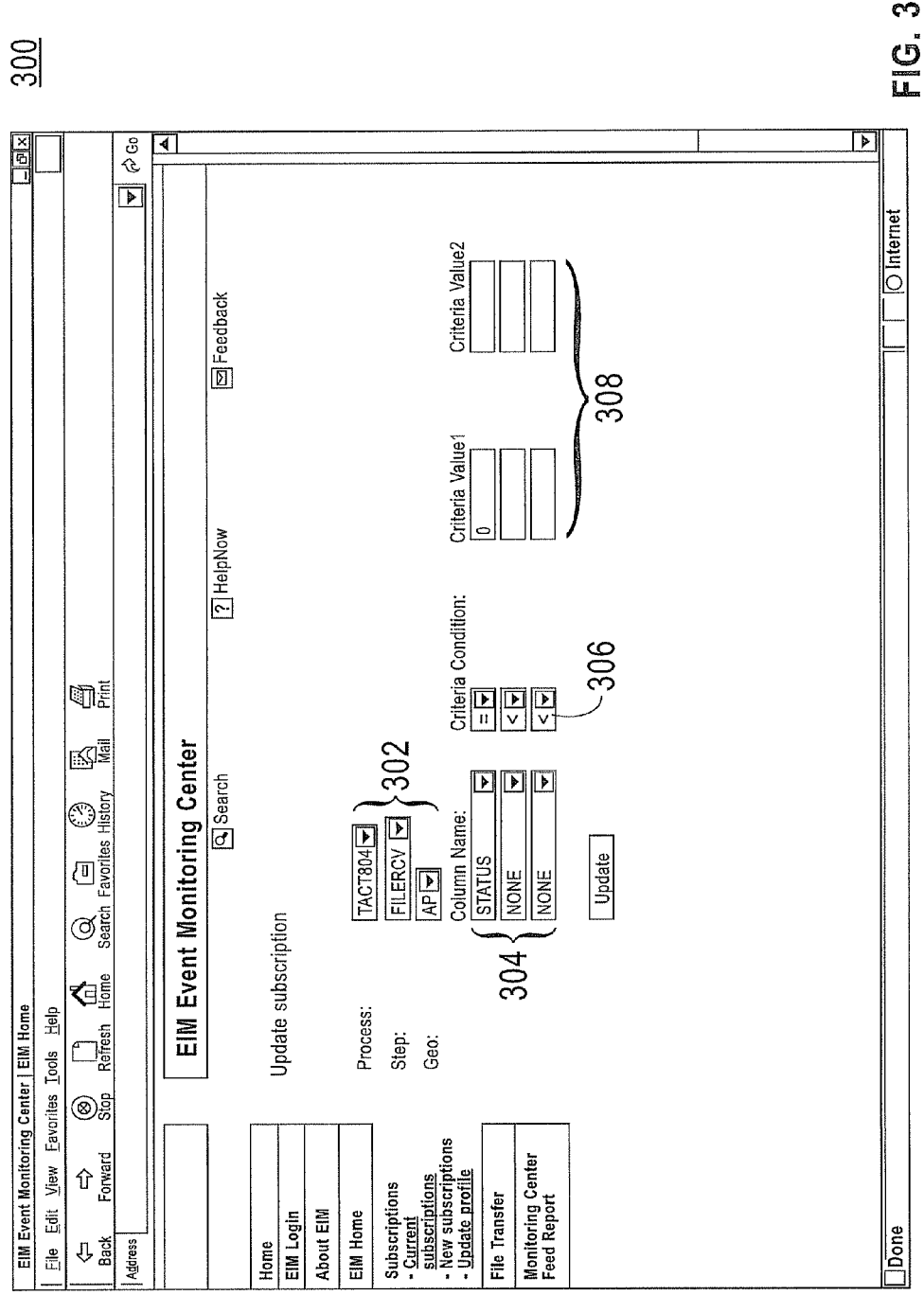
FIG. 3 is a user interface screen for defining rules used in implementing the data asset management activities in exemplary embodiments.

At step 204, the data steward defines rules for conducting audits and audit response activities. In addition, the data steward defines rules for generating notifications that include designating one or more individuals of the enterprise who should receive the notifications. The notification profile, management hierarchy, rule definition and pattern definitions may be represented as a user interface of the data steward rules engine 120. For example, a user interface screen illustrating sample data fields for use in defining rules is shown in FIG. 3.

As shown in user interface screen 300, data fields 302-308 are provided for defining rules to be applied to specified probes. By way of example, a rule may be defined that looks at a data pattern (e.g., address information), and if a number of instantiations of the data (e.g., rows discovered in the probe) exceed a pre-defined limit or range (as specified in fields 306 and 308), the network entity and/or user of the network entity is determined to be non-compliant. There may be several instances of non-compliance where multiple rules are established for a specific probe.

The permissions and rules are stored in storage device 116 at step 206.

At step 208, an audit is elected and implemented for the network entities.

As indicated above, the network entities deployed within the enterprise system of FIG. 1 include probe instrumentation. Periodically, a probe agent of the instrumentation "calls in" to the data steward rules engine 120, the authorization and authentication APIs 122 and 124, respectively, as well as storage device 116 to retrieve the latest set of data patterns. When a data pattern has been identified via events occurring on the network entity (e.g., access, use, manipulation, or retrieval of data from a data asset), the information is be collected (e.g., a number of "hits" detected for the system) and a sample of the data is sent with the instance hits, as well as system/user identifiers back to the data steward rules engine 120 and storage device 116.

Figure 4:
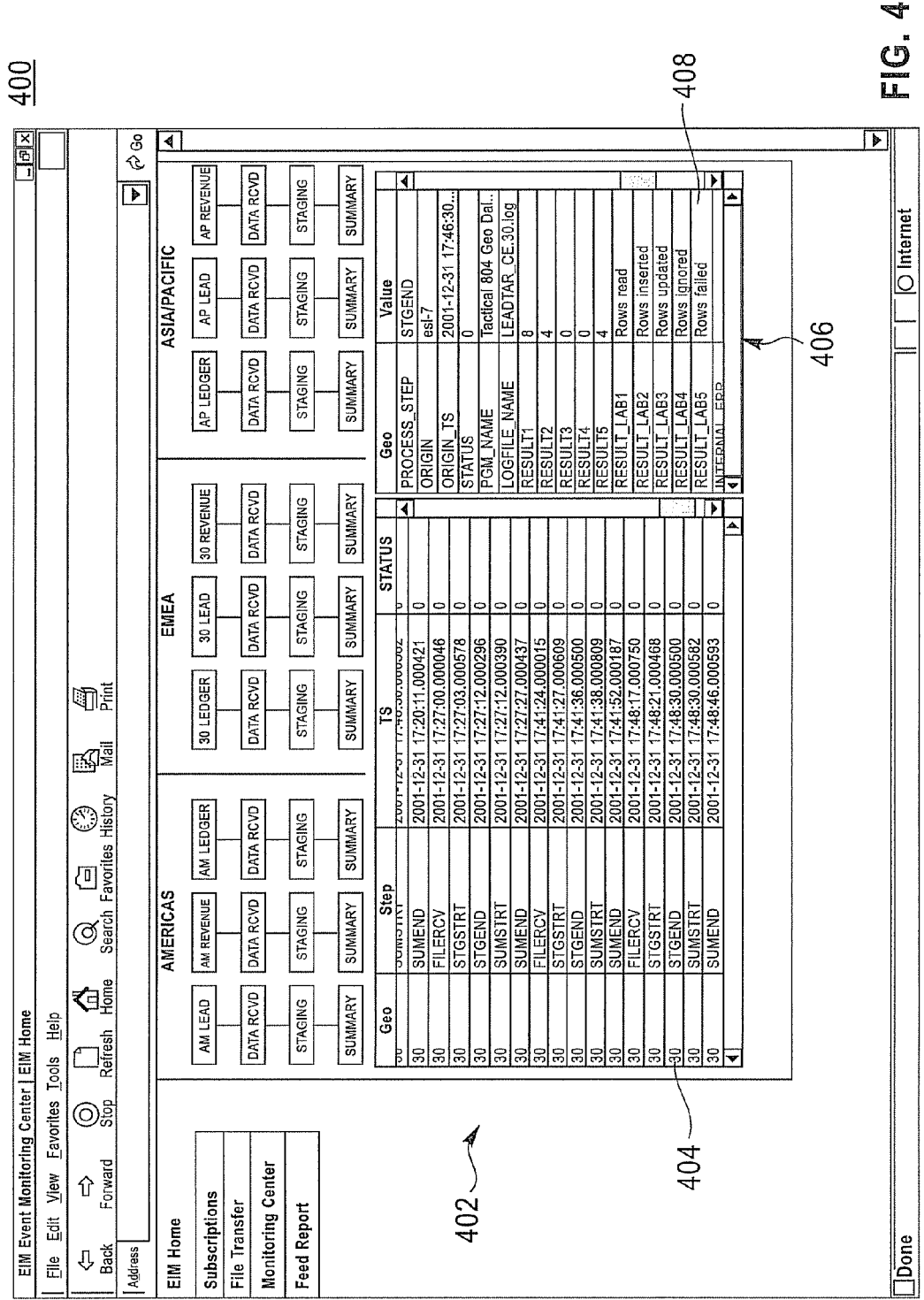
FIG. 4 is a user interface screen depicting a summary of probe results used in implementing the data asset management activities in exemplary embodiments.

At step 210, results of the audit are gathered and summarized. A user interface screen 400 depicting a sample probe output summary is shown in FIG. 4.

The data steward rules engine 120 uses the probe results and executes the data steward rules in conjunction with the authorization and authentication information for the user (e.g., user system 104) or server (e.g., server 106) that was probed to determine if any of the established guidelines of the data steward have been violated as defined by the rules. In exemplary embodiments, the data steward rules engine 120 may be implemented for all enterprise data stewards for all domains. This rules engine 120 may contain agreed upon multi-domain rules for the enterprise. The data steward rules engine 120 may also access the metrics definitions in storage device 112, which provides a guide for interpreting the probe data after the rules have been executed against the probe data. The data steward rules engine 120 also accesses the notification profiles and hierarchy (e.g., management notification, asset ownership reference data) in storage device 116, which specifies who should be notified of results of the probes based upon the defined rules. At step 212, the data steward responsible for the data assets probed in the audit is identified and the results are made available to the data steward for review at step 214. As indicated above, non-compliance is determined when execution of an audit indicates that a value specified in the rules criteria is out of a specified range. As shown in the user interface screen 400 of FIG. 4, a window 402 lists each instance of non-compliance for a given probe rule. In order to view additional information concerning the non-compliance, a user, e.g., data steward may select a line in the window 402 (e.g., line 404, and the data steward rules engine 120 displays a second window 406 that identifies the name of the probe (first column) and the corresponding value (second column).

At step 216, it is determined whether any non-compliances have been detected. If so, a simplification strategy for the non-compliance is generated at step 218. The output of the rules engine 120 processing the probe information is deposited into storage device 112 (also referred to herein as "enterprise simplification data warehouse") via, e.g., transformation and load processes to the enterprise simplification data warehouse 112 whereby the metrics definitions are applied and placed in the warehouse 112. The output is aggregated with other similar probe outputs in the data warehouse 112. The enterprise simplification data warehouse 112 provides details of the assessments with the business rules applied to then leverage data mining tools to characterize the enterprise landscape in terms of where data currently resides, by quantity. This information may be used to confirm any need to know rules and validate that the current assumptions regarding data flows are factual. A simplification strategy may suggest removal of duplicate data, as well as re-purposing of existing data. For example, if a particular user is discovered to have unauthorized access to a data asset, pursuant to an evaluation of the use of the data by the user, it may be suggested that the user be authorized access to the data for a specified limited purpose. A simplification strategy may also recommend additional restrictive controls over a data asset (e.g., a database of personal customer information), whereby additional or modified authorization and authentication requirements are placed on the data asset with respect to specified users.

The simplification strategy is distributed to network entities (e.g., NC AOM 110) identified by the notification rules generated above in step 204, in addition to a compliance (or non-compliance) report card at step 220. If no non-compliances were detected at step 216, the compliance report card is generated and distributed to network entities (e.g., NC AOM 110) identified by the notification rules generated above in step 204. The simplification strategy is reviewed and implemented for the enterprise.

Given the content of the enterprise simplification data warehouse 112, the data steward has the insight to validate the current view of information assets and identify "gaps" with the strategic, or desired view. If gaps are identified, this enables the data steward to then formulate a factual accounting of the IT assets containing data within his/her domain and formulate a compliance "scorecard" for the application owners (e.g., users of AOM system 110) that are identified in the gap via a reporting function. This allows a positive, non-subjective approach to managing the information flows within the business rather than relying on folklore and manual subjective surveys to render compliance responses. The reports/mining opportunities from reporting function allows the data steward to also identify any "anonymous" processes for the enterprise that are currently being supported by IT assets that are not considered strategic. This gives the enterprise the opportunity to address the process and project a target IT asset for accommodation.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing data asset management activities, comprising:
   defining, via an application executing on a computer processor, authorization and authentication permissions for accessing network entities of an organization;
   defining, via the application, rules for conducting audits and audit response activities with respect to the network entities, the rules including criteria for identifying a non-compliance;
   defining, via the application, a data pattern;
   implementing, via the application, a probe on the network devices, the probe discovering data patterns, structured and unstructured, from the events occurring on the network entities;
   executing, via the application, an audit of the network entities by applying the rules to events occurring at the network entities and the data patterns during the audit; and
   generating, via the application, a summary of results of the audit.

2. The method of claim 1, wherein the authorization and authentication permissions and the rules are defined for a data domain.

3. The method of claim 1, further comprising:
   identifying an event as non-compliant when execution of the audit indicates a value that is out of a specified range, the range designated by the criteria.

4. The method of claim 1, wherein the response activities include defining conditions for generating a notification of non-compliance and specifying network entities to be notified of a non-compliance.

5. The method of claim 1, further comprising:
   storing aggregated audit results in a data warehouse; and
   searching the data warehouse to identify gaps in compliance as defined by business policies and regulations.

6. The method of claim 5, further comprising:
   generating and implementing a simplification strategy for remedying any identified gaps, the simplification strategy including at least one of:
   additional restrictive controls over a data asset; and
   authorizing use of a data asset for a specified purpose.

7. A system for implementing data asset management activities, comprising:
   a host system; and
   a data steward rules engine executing on the host system, the data steward rules engine implementing a method, comprising:
   defining authorization and authentication permissions for accessing network entities of an organization;
   defining rules for conducting audits and audit response activities with respect to the network entities, the rules including criteria for identifying a non-compliance;
   defining a data pattern;
   implementing a probe on the network devices, the probe discovering data patterns, structured and unstructured, from the events occurring on the network entities;
   executing an audit of the network entities by applying the rules to events occurring at the network entities and the data patterns during the audit; and
   generating a summary of results of the audit.

8. The system of claim 7, wherein the authorization and authentication permissions and the rules are defined for a data domain.

9. The system of claim 7, wherein the data steward rules engine further implements:
   identifying an event as non-compliant when execution of the audit indicates a value that is out of a specified range, the range designated by the criteria.

10. The system of claim 7, wherein the response activities include defining conditions for generating a notification of non-compliance and specifying network entities to be notified of a non-compliance.

11. The system of claim 7, wherein the data steward rules engine further implements:
    storing aggregated audit results in a data warehouse;
    searching the data warehouse to identify gaps in compliance as defined by business policies and regulations; and generating and implementing a simplification strategy for remedying any identified gaps, the simplification strategy including at least one of:
additional restrictive controls over a data asset; and
authorizing use of a data asset for a specified purpose.

12. A computer program product for implementing data asset management activities, the computer program product including instructions for implementing a method, the method comprising:
defining authorization and authentication permissions for accessing network entities of an organization;
defining rules for conducting audits and audit response activities with respect to the network entities, the rules including criteria for identifying a non-compliance;
defining a data pattern;
implementing a probe on the network devices, the probe discovering data patterns, structured and unstructured, from the events occurring on the network entities;
executing an audit of the network entities by applying the rules to events occurring at the network entities and the data patterns during the audit; and
generating a summary of results of the audit.

13. The computer program product of claim 12, wherein the authorization and authentication permissions and the rules are defined for a data domain.

14. The computer program product of claim 12, further comprising instructions for implementing:
identifying an event as non-compliant when execution of the audit indicates a value that is out of a specified range, the range designated by the criteria.

15. The computer program product of claim 12, wherein the response activities include defining conditions for generating a notification of non-compliance and specifying network entities to be notified of a non-compliance.

16. The computer program product of claim 12, further comprising instructions for implementing:
storing aggregated audit results in a data warehouse; and
searching the data warehouse to identify gaps in compliance as defined by business policies and regulations.

17. The computer program product of claim 16, further comprising instructions for implementing:
generating and implementing a simplification strategy for remedying any identified gaps, the simplification strategy including at least one of:
additional restrictive controls over a data asset; and
authorizing use of a data asset for a specified purpose.

* * * * *